US009797770B2

(12) United States Patent
Debates et al.

(10) Patent No.: US 9,797,770 B2
(45) Date of Patent: Oct. 24, 2017

(54) STOWED DEVICE DETECTION USING MULTIPLE SENSORS

(71) Applicant: Motorola Mobility LLC, Chicago, IL (US)

(72) Inventors: Scott Debates, Crystal Lake, IL (US); Nathan M Connell, Glenview, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 154 days.

(21) Appl. No.: 15/001,345

(22) Filed: Jan. 20, 2016

(65) Prior Publication Data

US 2017/0205280 A1 Jul. 20, 2017

(51) Int. Cl.
*H04M 1/725* (2006.01)
*G01J 1/42* (2006.01)
*H04M 1/24* (2006.01)
*G01D 5/26* (2006.01)

(52) U.S. Cl.
CPC .............. *G01J 1/42* (2013.01); *G01D 5/26* (2013.01); *H04M 1/24* (2013.01)

(58) Field of Classification Search
CPC .......... H04M 1/72569; H04W 52/0258; H05B 37/0218; H05B 37/0227
USPC ......................................... 250/214 AL, 221
See application file for complete search history.

(56) References Cited

U.S. PATENT DOCUMENTS 9,125,144 B1 * 9/2015 Orbach ................ H04M 19/04

* cited by examiner

*Primary Examiner* — Que T Le

(57) ABSTRACT

A computing device determines whether the device is in a Stowed state (a state in which the device is stowed in a location such as a pocket, purse, bag, etc.) or a Not Stowed state (a state in which the device is not stowed in such a location). This determination is made using multiple different sensors on the device, at least one of which is situated on one side (e.g., the front or top) of the device and at least one of which is situated on the opposite side (e.g., the back or bottom) of the device. Values sensed by these multiple different sensors are used to determine whether the device is in the Stowed state or the Not Stowed state, as well as optionally to generate a confidence value indicating how confident the device is in its determination that it is in the Stowed state.

20 Claims, 5 Drawing Sheets

STOWED DEVICE DETECTION USING MULTIPLE SENSORS

BACKGROUND

As technology has advanced, people have become increasingly reliant upon a variety of different computing devices, such as cellular or other wireless phones. While these computing devices offer a variety of different benefits, they are not without their problems. One such problem is that people oftentimes put their devices in a pocket, bag, purse, and so forth. When doing so, functionality of the device can accidentally be activated due to the device coming in contact with other items in a bag or purse, pressure applied to the device by a person's body when in his or her pocket, and so forth. This accidental activation of device functionality, however, can lead to user dissatisfaction and frustration with their computing devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, at least a first sensor is used to sense data including at least an ambient light value indicating an amount of light sensed by the first sensor in a computing device. A check is made as to whether the ambient light value is below a first threshold amount. In response to the ambient light value being below the first threshold amount, a determination is made as to whether the computing device is currently stowed or not stowed based on values from at least a second sensor situated on a first side of the computing device and a third sensor situated on a second side of the computing device, and an indication of whether the computing device is determined to be currently stowed or not stowed is stored.

In accordance with one or more aspects, a computing device includes a sensor system including a first sensor comprising an ambient light sensor, a second sensor situated on a first side of the computing device, and a third sensor situated on a second side of the computing device. The computing device also includes a processor and a computer-readable storage medium having stored thereon multiple instructions that, responsive to execution by the processor, cause the processor to perform acts comprising obtaining sensor data including at least an ambient light value indicating an amount of light sensed by the ambient light sensor, checking whether the ambient light value is below a first threshold amount, determining, in response to the ambient light value being below the first threshold amount, whether the computing device is currently stowed or not stowed based on values from at least the second sensor and the third sensor, and reporting an indication of whether the computing device is determined to be currently stowed or not stowed.

In accordance with one or more aspects, a computing device includes a sensor system including a proximity sensor situated on a first side of the computing device and a first additional sensor situated on a second side of the computing device. The computing device also includes a processor and a computer-readable storage medium having stored thereon multiple instructions that, responsive to execution by the processor, cause the processor to perform acts comprising checking whether the proximity sensor indicates an object is in close proximity to the computing device, checking, in response to the proximity sensor indicating that an object is in close proximity to the computing device, whether the first additional sensor indicates an object is within a first threshold distance of the computing device, and determining, in response to the first additional sensor indicating an object is within the first threshold distance of the computing device, with a first confidence value that the computing device is likely stowed.

BRIEF DESCRIPTION OF THE DRAWINGS

Embodiments of stowed device detection using multiple sensors are described with reference to the following drawings. The same numbers are used throughout the drawings to reference like features and components.

DETAILED DESCRIPTION

Stowed device detection using multiple sensors is discussed herein. A computing device can be in one of two different states at any given time, one of which is referred to as a Stowed state and the other is referred to as a Not Stowed state. The Stowed state refers to a state in which the computing device is stowed in a location such as a pocket, purse, bag, etc., whereas the Not Stowed state refers to a state in which the computing device is not stowed in such a location. The computing device can operate in different manners based on whether the computing device is in the Stowed state or Not Stowed state, such as by allowing display of a user interface on a screen when in the Not Stowed state but not allowing such display when in the Stowed state, by allowing user inputs via a touchscreen when in the Not Stowed state but not allowing such user inputs when in the Stowed state, and so forth.

The techniques discussed herein allow a computing device to determine whether the computing device is in the Stowed state or the Not Stowed state. This determination is made using multiple different sensors on the computing device, at least one of which is situated on one side of the computing device (e.g., the front of the computing device) and at least one of which is situated on the opposite side of the computing device (e.g., the back of the computing device). The sensors can include, for example, an ambient light sensor, a proximity sensor, a laser sensor, an infrared sensor, and so forth as discussed in more detail below. Values sensed by these multiple different sensors are used to determine whether the computing device is in the Stowed state or the Not Stowed state, as well as optionally to generate a confidence value indicating how confident the computing device is in a determination that it is in the Stowed state.

Figure 1:
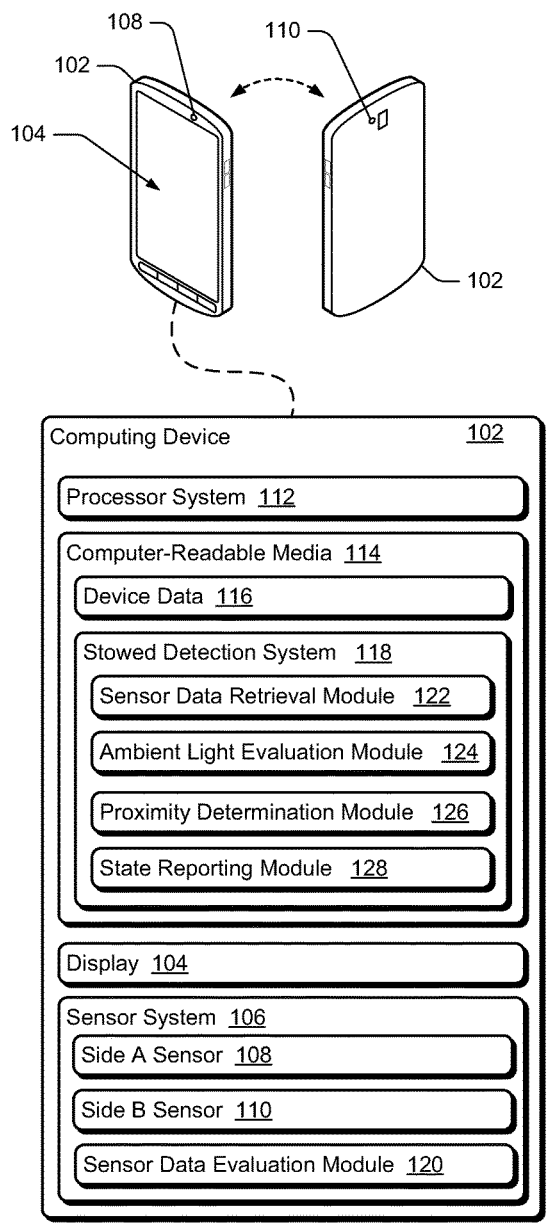
FIG. 1 illustrates an example computing device implementing the techniques discussed herein.

FIG. 1 illustrates an example computing device 102 implementing the techniques discussed herein. The computing device 102 can be, or include, many different types of computing or electronic devices. In this example, the computing device 102 is shown as a smartphone, though other devices are contemplated. Other computing devices 102 may include, by way of example, a cellular phone, notebook computer (e.g., netbook or ultrabook), laptop computer, camera (e.g., compact or single-lens reflex), smart-watch, smart-glasses, tablet or phablet computer, personal media player, personal navigating device (e.g., global positioning system), gaming console, video camera, portable gaming device, and so forth.

The computing device 102 includes a display 104 and a sensor system 106. The display 104 can be configured as any suitable type of display, such as an organic light-emitting diode (OLED) display, active matrix OLED display, liquid crystal display (LCD), in-plane shifting LCD, and so on. The display 104 is situated on one side of computing device 102, typically referred to as the front of the computing device 102.

The sensor system 106 includes one or more sensors 108 situated on one side (referred to as side A) of the computing device 102 as well as one or more sensors 110 situated on another side (referred to as side B), typically the opposite side from side A, of the computing device 102. Side A and side B can be any of a variety of different pairs of sides of the computing device 102, and typically are pairs of opposite sides. For example, side A can be the top of the computing device 102 and side B can be the bottom of the computing device 102, side A can be the left-hand side of the computing device 102 and side B can be the right-hand side of the computing device 102, and so forth. In one or more embodiments, the sensors 108 are situated on the same side of the computing device 102 as the display 104 (the front of the computing device 102) and the sensors 110 are situated on the back of the computing device 102.

The sensor system 106 can include any of various different types of sensors that are able to detect an object being close to (e.g., within a threshold distance of) the computing device 102, sensors that are able to detect a distance to an object (a distance away from the computing device that an object is), sensors that are able to detect a light level in an environment in which the computing device 102 is situated, and so forth. In one or more embodiments, at least one of the one or more sensors in the sensor system 106 has an associated transmitter that transmits a signal in any of a variety of different frequencies of the electromagnetic spectrum, such as visible light frequencies, infrared frequencies, radio wave frequencies, and so forth. A sensor in the sensor system 106 is configured to sense the signal transmitted from the transmitter and reflected off of an object. Additionally or alternatively, at least one of the one or more sensors in the sensor system 106 is able to detect a value without having an associated transmitter, such as an ambient light sensor that detects the amount of (e.g., an intensity of) light that is reaching the sensor.

Examples of sensors that can be included in sensor system 106 include an infrared sensor that senses infrared light reflected from objects, and a laser sensor that senses light transmitted by a laser transmitter from the computing device and reflected back to the laser sensor by various objects. Another type of sensor that can be included in the sensor system 106 is an ambient light sensor, which senses the amount of (e.g., an intensity of) light that is reaching the sensor (e.g., the amount of light in the environment in which the computing device 102 is situated). Another type of sensor that can be included in the sensor system 106 is a proximity sensor that detects whether an object is in close physical proximity to the computing device 102. For example, a proximity sensor on one side (e.g., the front) of the computing device 102 can detect whether an object is within a threshold distance of (e.g., 3-5 millimeters of) that side (e.g., the front) of the computing device 102.

In one or more embodiments, the sensor system 106 includes as side A sensors 108 a proximity sensor and an infrared sensor, and as a side B sensor 110 a laser sensor. The sensor system 106 also includes an ambient light sensor, which can be implemented as a side A sensor 108 or a side B sensor 110. Alternatively, the ambient light sensor can be situated on a third side of the computing device 102 (e.g., rather than on side A or side B, the ambient light sensor can be situated on the top of the computing device 102).

At least one side A sensor 108 and at least one side B sensor 110 is used by the computing device 102 to determine whether the computing device 102 is in the Stowed state or the Not Stowed state. The sensor system 106 can include sensors that are shared, which refers to the sensors being used for functionality in the computing device 102 in addition to determining whether the computing device 102 is in the Stowed state or the Not Stowed state. This additional functionality can include, for example, determining a distance to an object to facilitate focusing a camera, determining whether computing device 102 is being held close to a user's head (e.g., a user making a phone call), and so forth. Additionally or alternatively, the sensor system 106 can include sensors that are dedicated (not shared), which refers to the sensors being used solely for determining whether the computing device 102 is in the Stowed state or the Not Stowed state.

The computing device 102 also includes a processor system 112 that includes one or more processors, each of which can include one or more cores. The processor system 112 is coupled with, and may implement functionalities of, any other components or modules of the computing device 102 that are described herein. In one or more embodiments, the processor system 112 includes a single processor having a single core. Alternatively, the processor system 112 includes a single processor having multiple cores and/or multiple processors (each having one or more cores). In embodiments in which the processor system 112 includes multiple cores and/or multiple processors, the processor system 112 can include a high power processor or core as well as a low power processor or core, and the functionality to determine whether the computing device 102 is in the Stowed state or the Not Stowed state can be implemented by the low power processor or core. A low power processor or core refers to a processor or core that consumes less power when running programs than a high power processor or core consumes when running programs. This lower power consumption can be a result of a lower clock speed (e.g., 90 Megahertz (MHz) for the low power processor or core and 2 Gigahertz (GHz) for the high power processor or core), processor or core architecture, and so forth. Additionally or alternatively, a processor or core can be placed in a low power mode (e.g., operating at a slower clock speed) when determining whether the computing device 102 is in the Stowed state or the Not Stowed state.

The computing device 102 also includes computer-readable media 114. The computer-readable media 114 includes device data 116, such as an operating system, firmware, or applications of the computing device 102 that are executable by the processor system 112. Alternatively or additionally, the device data 116 may include various user data, such as images, music, documents, emails, contacts, and the like. The computer-readable media 114 also includes stowed detection system 118, which in this example is embodied as computer-executable code stored on the computer-readable media 114. Although illustrated as being stored on the computer-readable media 114, the stowed detection system 118 can alternatively be implemented at least in part in hardware (e.g., as an application-specific integrated circuit (ASIC), a field-programmable gate array (FPGA), and so forth).

The sensor system 106 also includes one or more sensor data evaluation modules 120. The sensor data evaluation module 120 is illustrated as being part of the sensor system 106, and can be implemented separate from, or alternatively as part of, sensors 108 and/or sensors 110. The sensor data evaluation module 120 is optionally implemented at least in part as computer-executable code stored on computer-readable media 114. The sensor data evaluation module 120 evaluates data obtained from the sensor 108 and/or sensor 110, such as to determine a distance from the computing device 102 to an object. Given a type of transmitted signal and the speed at which the transmitted signal travels, the distance to an object can be readily determined by time of flight of the signal that is reflected from the object.

The stowed detection system 118 includes a sensor data retrieval module 122, an ambient light evaluation module 124, a proximity determination module 126, and a state reporting module 128. The sensor data retrieval module 122 obtains data from the sensor system 106, which can be the values as sensed by the sensor 108 and/or the sensor 110, or data obtained after being evaluated by the sensor data evaluation module 120. These retrieved values are provided to the ambient light evaluation module 124 and/or the proximity determination module 126 for analysis. The ambient light evaluation module 124 analyzes the ambient light sensed by an ambient light sensor included in the sensor system 106 (e.g., as a sensor 108 or sensor 110) and determines whether the computing device 102 is in the Stowed state or the Not Stowed state based at least in part on the sensed ambient light. The proximity determination module 126 analyzes values obtained by additional sensors of the sensor system 106, including at least one side A sensor 108 and at least one side B sensor 110, and determines whether an object is in close proximity (e.g., within one threshold distance) or somewhat close (e.g., within another, larger, threshold distance) to side A and side B of the computing device 102. The state reporting module 128 reports whether the stowed detection system 118 has determined that the computing device is in the Stowed state or the Not Stowed state, and optionally provides a confidence value indicating how certain the stowed detection system 118 is of the computing device 102 being in the Stowed state.

Figure 2:
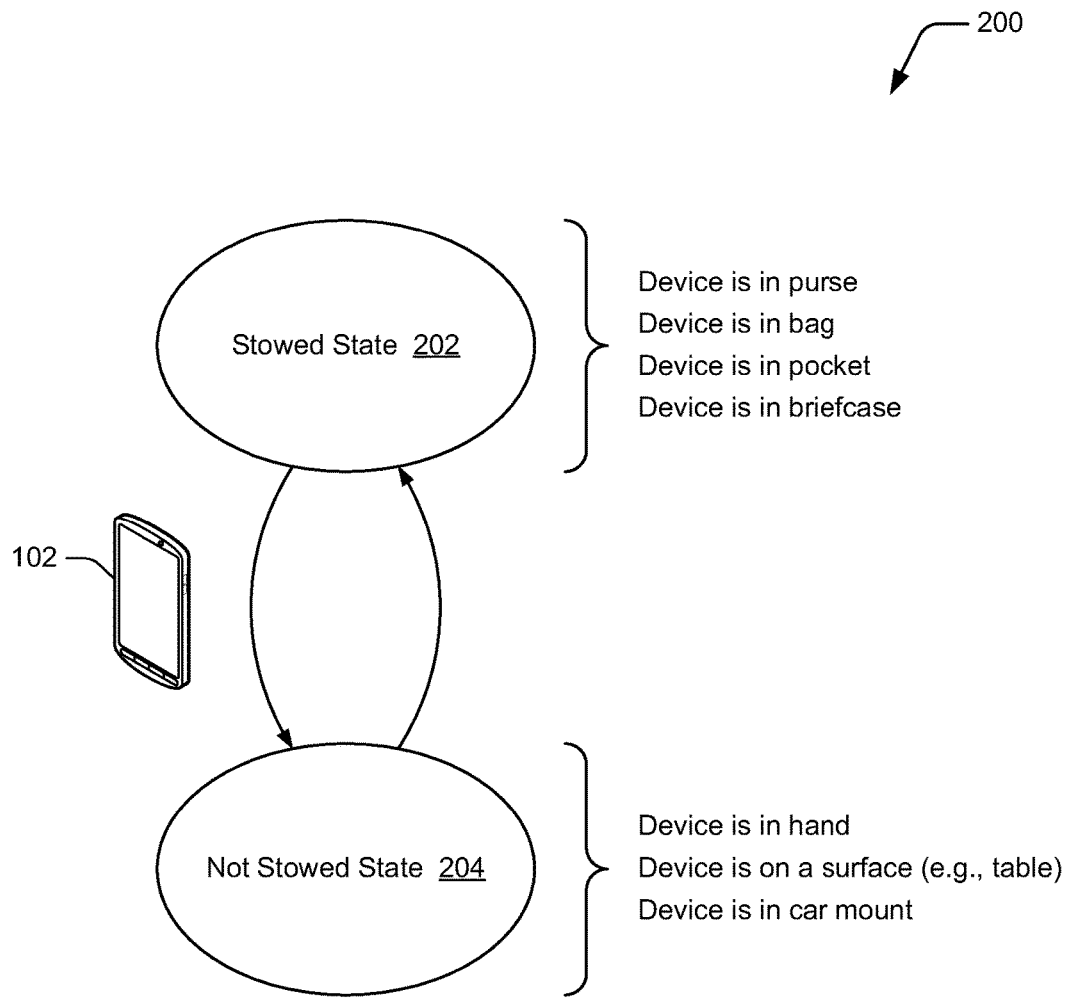
FIG. 2 is a state diagram illustrating the different states of the computing device in accordance with one or more embodiments.

FIG. 2 is a state diagram 200 illustrating the different states of the computing device 102 in accordance with one or more embodiments. The computing device 102 can be in the Stowed state 202 or the Not Stowed state 204, and transitions between the two states 202 and 204. The Stowed state 202 refers to a state in which the computing device 102 is stowed in a location such as a purse, bag, pocket, briefcase, and so forth. In the Stowed state 204, the computing device 102 assumes that the user is not intending to actuate buttons, select items or buttons displayed on a touch screen, or provide similar inputs to the computing device 102. The Not Stowed state 206 the refers to a state in which the computing device is not stowed in such a location, such as the computing device 102 being in user's hand, on a table or other surface, in a car or other vehicle mount, and so forth. In the Not Stowed state 206, the computing device 102 assumes that the user may be intending to actuate buttons, select items or buttons displayed on a touch screen, or provide similar inputs to the computing device 102.

The stowed detection system 118 of FIG. 1 determines whether the computing device 102 is in the Stowed state 202 or the Not Stowed state 204, as discussed in more detail below. Once the determination is made by the stowed detection system 118, one or more other programs, components, or modules of the computing device 102 can be notified of the determination. These other programs, components, or modules can take an appropriate action in response to the determined state of the computing device 102, such as performing one or more other techniques to verify whether the computing device 102 is stowed, allowing or not allowing display of a user interface on the display 104, allowing or not allowing user inputs via a touchscreen of the display 104, activating or deactivating a user interface display on the display 104, and so forth.

Figure 3:
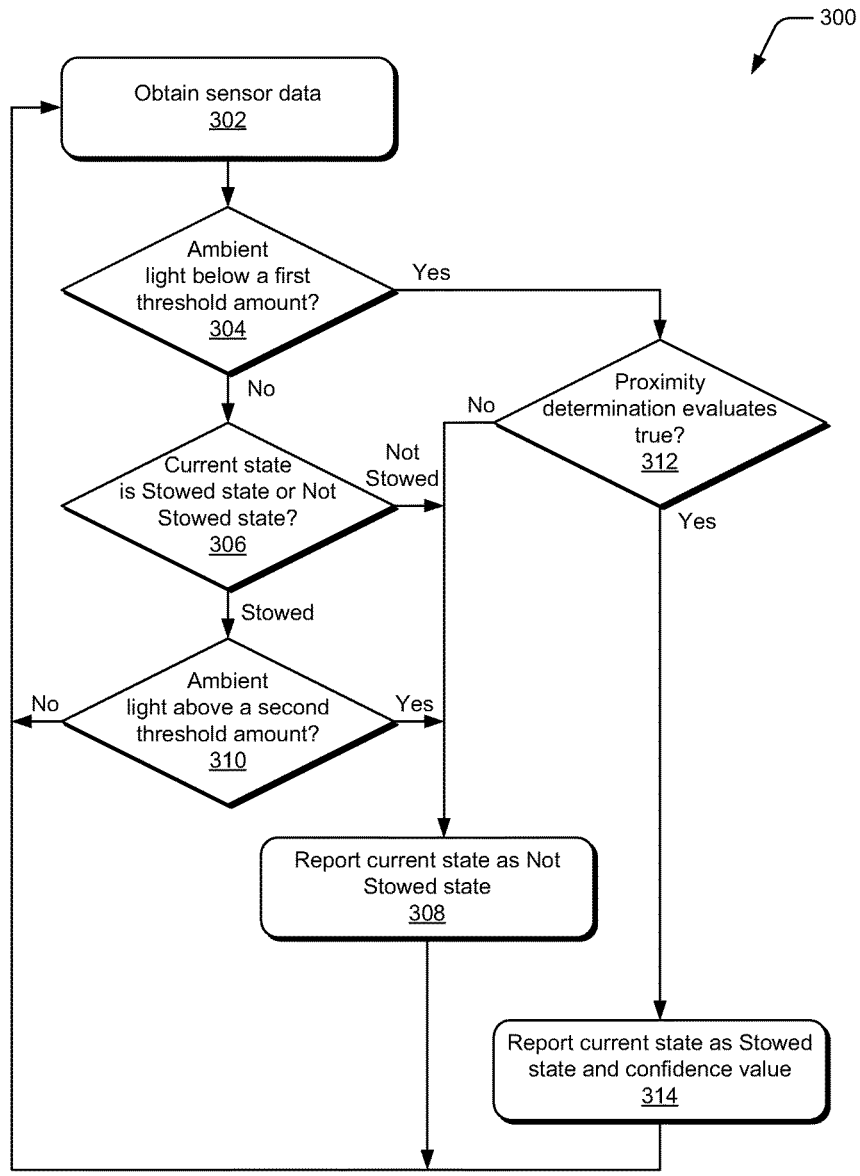
FIG. 3 illustrates an example process for implementing the techniques discussed herein in accordance with one or more embodiments.

FIG. 3 illustrates an example process 300 for implementing the techniques discussed herein in accordance with one or more embodiments. Process 300 is carried out by a stowed detection system, such as the stowed detection system 118 of FIG. 1, and can be implemented in software, firmware, hardware, or combinations thereof. Process 300 is shown as a set of acts and is not limited to the order shown for performing the operations of the various acts.

In process 300, sensor data is obtained (act 302). The sensor data is obtained from the sensors of the computing device, such as the sensor system 106 of FIG. 1. For an ambient light sensor, the data obtained is a value indicating the amount of light (the intensity of light) that is sensed by the ambient light sensor. For a proximity sensor, the data obtained is a value indicating whether the proximity sensor sensed an object in close physical proximity to the computing device (to the sensor). The proximity sensor is configured with a particular threshold distance (e.g., 3 millimeters or 5 millimeters) and returns one value (e.g., true) if the proximity sensor detects an object within that threshold distance, and another value (e.g., false) if the proximity sensor does not detect an object within the threshold distance.

For a laser sensor, the data obtained in act 302 is a value indicating a distance from the computing device (the laser sensor) to an object (e.g., the closest object). Alternatively, the data obtained can be a value from which the stowed detection system can determine the distance from the computing device (the laser sensor) to an object, such as a time of flight of a transmitted signal (which can readily be used to determine, given the speed at which light travels, the distance to an object). Similarly, for an infrared sensor, the data obtained in act 302 is a value indicating a distance from the computing device (the infrared sensor) to an object (e.g., the closest object). Alternatively, the data obtained can be a value from which the stowed detection system can determine the distance from the computing device (the infrared sensor) to an object, such as a time of flight of a transmitted signal (which can readily be used to determine, given the speed at which light travels, the distance to an object).

Data can be obtained from all of the sensors in act 302 or alternatively only a subset of the sensors. For example, data from an ambient light sensor can be obtained in act 302, and data from other sensors can be obtained if the proximity determination evaluation is made as discussed below in process 400 of FIG. 4. Alternatively, data from all of the sensors that may be used in process 300 or process 400 can be obtained in act 302.

A check is then made as to whether the sensed ambient light is below a first threshold amount (act 304). The sensed ambient light is the sensor data value obtained from the ambient light sensor in act 302. The sensed ambient light being below the first threshold amount refers to the sensed ambient light being less than, or alternatively less than or equal to, the first threshold amount. The first threshold amount is an amount that is typically associated with a dark environment (such as a pocket, purse, bag, etc.). In one or more embodiments, the first threshold amount is 20 lux, although other values can alternatively be used.

If the ambient light is not below the first threshold amount, then a check is made as to whether the current state of the computing device is the Stowed state or the Not Stowed state (act 306). If the current state of the computing device is the Not Stowed state, then the stowed detection system determines that the computing device is not stowed and reports that the current state of the computing device is still the Not Stowed state (act 308). The process 300 then returns to act 302 to again obtain sensor data (e.g., optionally after waiting a particular amount of time, such as 0.5 seconds or 1 second).

Returning to act 306, if the current state of the computing device is the Stowed state, then a check is then made as to whether the sensed ambient light is above a second threshold amount (act 310). The sensed ambient light in act 310 is the sensor data value obtained from the ambient light sensor in act 302. The sensed ambient light being above the second threshold amount refers to the sensed ambient light being greater than, or alternatively greater than or equal to, the second threshold amount. The second threshold amount is an amount that is typically associated with a light environment (e.g., a location other than a pocket, purse, bag, etc.). In one or more embodiments, the second threshold amount is 50 lux, although other values can alternatively be used.

If the ambient light is not above the second threshold amount, then the process 300 returns to act 302 to again obtain sensor data (e.g., optionally after waiting a particular amount of time, such as 0.5 seconds or 1 second). No change is made of the state of the computing device (it remains in the Stowed state). However, if the ambient light is above the second threshold amount, then the stowed detection system determines that the computing device is not stowed and reports that the current state of the computing device is now the Not Stowed state (act 308). The process 300 then returns to act 302 to again obtain sensor data (e.g., optionally after waiting a particular amount of time, such as 0.5 seconds or 1 second).

Returning to act 304, if the ambient light is below the first threshold amount, then a check is made as to whether a proximity determination evaluates true (act 312). The proximity determination is discussed below with reference to process 400 of FIG. 4. The proximity determination evaluating to true indicates that the proximity determination indicates that the computing device is in close enough proximity to one or more other objects that it is likely stowed in a bag, purse, pocket, etc. Thus, if the proximity determination evaluates true, then the stowed detection system determines that the computing device is stowed and reports that the current state of the computing device is the Stowed state (act 314). The process 300 then returns to act 302 to again obtain sensor data (e.g., optionally after waiting a particular amount of time, such as 0.5 seconds or 1 second).

The proximity determination evaluating to false (not true) indicates that the proximity determination indicates that the computing device is not in close enough proximity to one or more other objects that it is likely stowed in a bag, purse, pocket, etc. Thus, the stowed detection system determines that the computing device is not stowed and reports that the current state of the computing device is the Not Stowed state (act 308). The process 300 then returns to act 302 to again obtain sensor data (e.g., optionally after waiting a particular amount of time, such as 0.5 seconds or 1 second).

The reporting of the current state of the computing device as the Not Stowed state in act 308 and/or the reporting of the current state of the computing device as the Stowed state in act 314 can take various different forms. In one or more embodiments, the reporting includes storing a value in the computer-readable 114 of FIG. 1, or in a register of a processor of the processor system 112 of FIG. 1. Additionally or alternatively, the reporting includes communicating a value to another component or module of the computing device 102 of FIG. 1.

Figure 4:
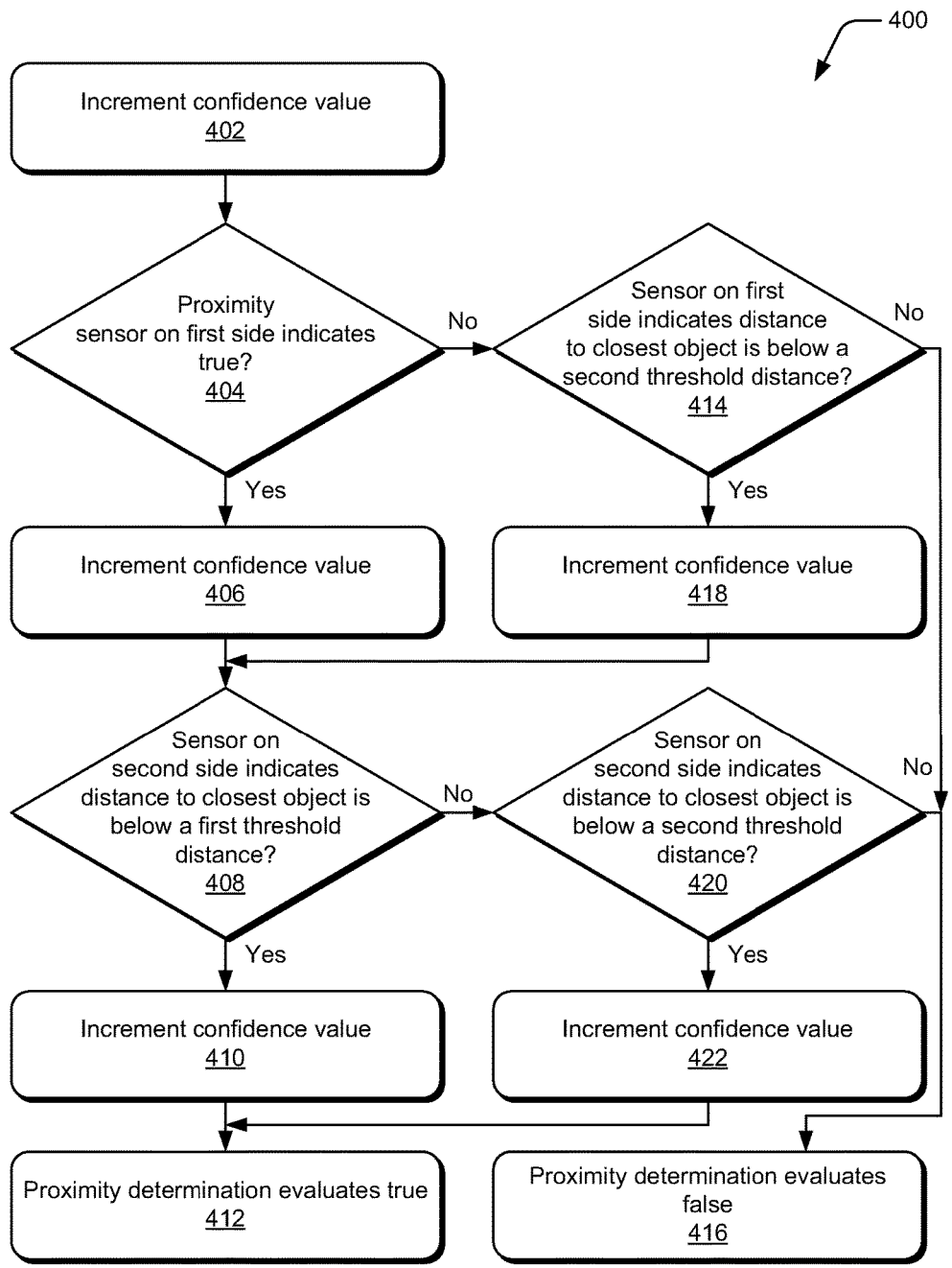
FIG. 4 illustrates an additional example process for implementing the techniques discussed herein in accordance with one or more embodiments.

FIG. 4 illustrates an additional example process 400 for implementing the techniques discussed herein in accordance with one or more embodiments. Process 400 is carried out by a stowed detection system, such as the stowed detection system 118 of FIG. 1, and can be implemented in software, firmware, hardware, or combinations thereof. Process 400 is shown as a set of acts and is not limited to the order shown for performing the operations of the various acts. In one or more embodiments, process 400 implements act 312 of FIG. 3, performing the proximity determination.

Process 400 uses sensor data obtained from multiple sensors, at least one on side A (e.g., the front) of the computing device and at least one on the opposite side B (e.g., the back) of the computing device. This sensor data can be obtained as part of act 302 of FIG. 3, or alternatively can be obtained at the beginning of process 400 (e.g., as part of or prior to act 402). Process 400 refers to a first side of the computing device and a second side of the computing device. In one or more embodiments, the first side of the computing device is the front of the computing device and the second side of the computing device is the back of the computing device, although other sides of a device can alternatively be used as the first and second sides.

In process 400, a confidence value is incremented (act 402). The confidence value is a value indicating a confidence that the stowed detection system has that the computing device is stowed. The confidence value is discussed herein as having a value ranging from 0% (indicating little or no confidence that the computing device is stowed) to 100% (indicating a very high confidence that the computing device is stowed). It should be noted, however, that other ranges or scales can be used, such as values ranging from 1 to 5, letter grades (e.g., A through F), and so forth.

In one or more embodiments, in act 402 the confidence level is incremented from 0% to an initial value, also referred to as setting the confidence value. In one or more embodiments, the confidence level is incremented by 50% in act 402, although the confidence value can alternatively be incremented by other amounts in act 402.

A check is then made as to whether the proximity sensor on the first side of the computing device indicates true (act 404). As discussed above, the proximity sensor indicates true if the proximity sensor detects an object within a threshold distance, and indicates false (not true) if the proximity sensor does not detect an object within the threshold distance.

If the proximity sensor indicates true, then the confidence value is again incremented (act 406). In one or more embodiments, the confidence value is incremented by 25% in act 406, although the confidence value can alternatively be incremented by other amounts in act 406.

A check is then made as to whether a sensor on the second side of the computing device indicates the distance to the closest object is below a first threshold distance (act 408). The sensor in act 408 is, for example, a laser sensor on the second side of the computing device. The distance being below the first threshold distance refers to the distance being less than, or alternatively less than or equal to, the first threshold distance. The first threshold distance is a distance that is typically associated with the computing device being very close to another object. In one or more embodiments, the first threshold distance is 6 millimeters, although other values can alternatively be used.

If the sensor on the second side of the computing device indicates that the distance to the closest object is below the first threshold distance, then the confidence value is again incremented (act 410). In one or more embodiments, the confidence value is incremented in act 410 by the same amount as in act 406 (e.g., 25%), although the confidence value can alternatively be incremented by other amounts in act 410.

The proximity determination evaluates to true (act 412). This evaluation also has an associated confidence value (e.g., as incremented in acts 402, 406, and 410).

As can be seen from the path through process 400 following acts 402, 404, 406, 408, 410, and 412, if a sensor on the first side of the computing device indicates that the computing device is in close proximity to another object (act 404), and a sensor on the second side of the computing device indicates that the computing device is in close proximity to another object (act 408), then the proximity determination evaluates to true because both the first side and the second side of the computing device are determined to be in close proximity to one or more objects.

Returning to act 404, if the proximity sensor does not indicate true (indicates false), then a check is made as to whether a sensor on the first side of the computing device indicates the distance to the closest object is below a second threshold distance (act 414). The distance being below the second threshold distance refers to the distance being less than, or alternatively less than or equal to, the second threshold distance. The second threshold distance is a distance that is typically associated with the computing device being somewhat close to another object, and is larger than the distance used to determine proximity by the proximity sensor in act 404. In one or more embodiments, the second threshold distance is 1 foot, although other values can alternatively be used.

The sensor in act 414 is, for example, an infrared sensor on the first of the computing device. In one or more embodiments, the sensor in act 414 is an additional sensor (a sensor in addition to the proximity sensor on the first side). Alternatively, the proximity sensor can be implemented using the same sensor (e.g., an infrared sensor) as is used in act 414.

If the sensor on the first side of the computing device indicates that the distance to the closest object is not below the second threshold distance, then the proximity determination evaluates to false (act 416). The sensors on the first side of the computing device indicate that the computing device is not at least somewhat close to another object, accordingly both the first and second sides of the computing device are not determined to be in close proximity or at least somewhat close to one or more objects.

However, if the sensor on the first side of the computing device indicates that the distance to the closest object is below the second threshold distance, then the confidence value is again incremented (act 418). In one or more embodiments, the second threshold distance is a farther (larger) distance than is used by the proximity sensor (e.g., one foot in act 414 as opposed to 3-5 millimeters in act 404), so the confidence value is incremented in act 418 by less than the confidence value would be incremented in act 406. For example, the confidence value may be incremented by 10% in act 418, although the confidence value can alternatively be incremented by other amounts in act 418.

Process 400 then proceeds to act 408. If the sensor on the second side of the computing device indicates that the distance to the closest object is below the first threshold distance, then the confidence value is again incremented (act 410), and the proximity determination evaluates to true (act 412). This evaluation also has an associated confidence value (e.g., as incremented in acts 402, 418, and 410). As can be seen from the path through process 400 following acts 402, 404, 414, 418, 408, 410, and 412, if the proximity sensor on the first side of the computing device indicates that the computing device is not in close proximity to another object (act 404) but a sensor on the first side of the computing device indicates that the computing device is somewhat close to another object (act 414), and a sensor on the second side of the computing device indicates that the computing device is in close proximity to another object (act 408), then the proximity determination evaluates to true because both the first side and the second side of the computing device are determined to be in close proximity or somewhat close to one or more objects. The confidence value resulting from the path through process 400 following acts 402, 404, 414, 418, 408, 410, and 412, however, is less than the confidence value resulting from the path through process 400 following acts 402, 404, 406, 408, 410, and 412, due to the differences in amounts the confidence value is incremented in acts 406 and 418.

Returning to act 408, if the sensor on the second side of the computing device indicates that the distance to the closest object is not below the first threshold distance, then a check is made as to whether the sensor on the second side of the computing device indicates the distance to the closest object is below a second threshold distance (act 420). The distance being below the second threshold distance refers to the distance being less than, or alternatively less than or equal to, the second threshold distance. The second threshold distance is a distance that is typically associated with the computing device being somewhat close to another object, and is larger than the first threshold distance in act 408. In one or more embodiments, the second threshold distance in act 420 is the same as in act 414 (e.g., 1 foot), although other values can alternatively be used.

In one or more embodiments, the sensor in act 420 is the same sensor as in act 408 (e.g., a laser sensor), although a different sensor on the second side of the computing device can alternatively be used in act 420.

If the sensor on the second side of the computing device indicates that the distance to the closest object is not below the second threshold distance, then the proximity determination evaluates to false (act 416). The sensor on the second side of the computing device indicates that the computing device is not at least somewhat close to another object (e.g., within 1 foot), accordingly both the first and second sides of the computing device are not determined to be in close proximity or at least somewhat close to one or more objects.

However, if the sensor on the second side of the computing device indicates that the distance to the closest object is below the second threshold distance, then the confidence value is again incremented (act 422). In one or more embodiments, the second threshold distance is a farther (larger) distance than the first threshold distance (e.g., one foot in act 420 as opposed to 6 millimeters in act 408), so the confidence value is incremented in act 422 by less than the confidence value would be incremented in act 410. For example, the confidence value may be incremented by 15% in act 422, although the confidence value can alternatively be incremented by other amounts in act 422.

Process 400 then proceeds to act 412, the proximity determination evaluating to true. This evaluation also has an associated confidence value (e.g., as incremented in acts 402, 406, and 422, or alternatively as incremented in acts 402, 418, and 422). As can be seen from the path through process 400 following acts 402, 404, 414, 418, 408, 420, 422, and 412, if the proximity sensor on the first side of the computing device indicates that the computing device is not in close proximity to another object (act 404) but another sensor on the first side of the computing device indicates that the computing device is somewhat close to another object (act 414), and a sensor on the second side of the computing device indicates that the computing device is not in close proximity to another object (act 408) but is somewhat close to another object (act 420), then the proximity determination evaluates to true because both the first side and the second side of the computing device are determined to be somewhat close to one or more objects. The confidence value resulting from the path through process 400 following acts 402, 404, 414, 418, 408, 420, 422, and 412, however, is less than the confidence value resulting from acts 402, 404, 406, 408, 410, and 412 (where sensors on the first and second sides of the computing device indicated that the computing device is in close proximity to one or more objects).

As can be seen from the path through process 400 following acts 402, 404, 406, 408, 420, 422, and 412, if the proximity sensor on the first side of the computing device indicates that the computing device is in close proximity to another object (act 404), and a sensor on the second side of the computing device indicates that the computing device is not in close proximity to another object (act 408) but is somewhat close to another object (act 420), then the proximity determination evaluates to true because both the first side and the second side of the computing device are determined to be at least somewhat close to one or more objects. The confidence value resulting from the path through process 400 following acts 402, 404, 406, 408, 420, 422, and 412, however, is less than the confidence value resulting from acts 404, 406, 408, 410, and 412 (where sensors on the first and second sides of the computing device indicated that the computing device is in close proximity to one or more objects).

Figure 5:
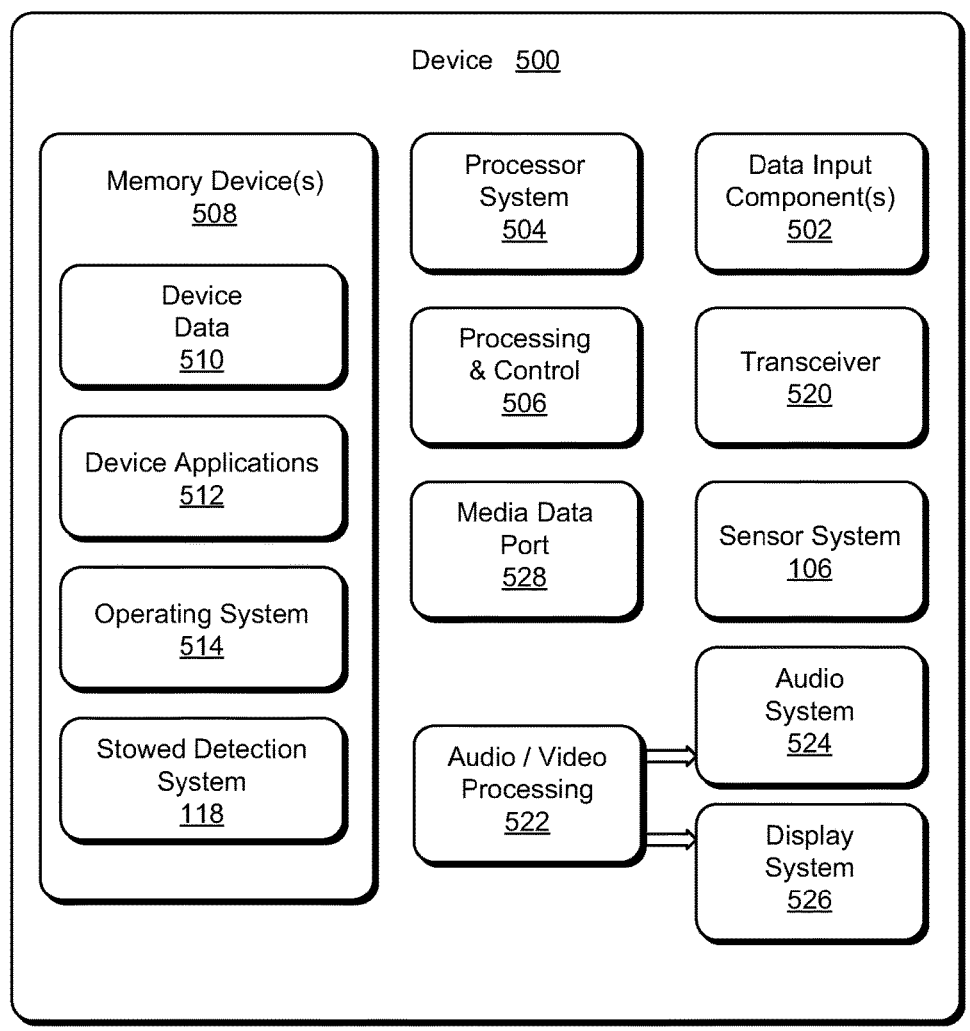
FIG. 5 illustrates various components of an example electronic device that can implement embodiments of the techniques discussed herein.

FIG. 5 illustrates various components of an example electronic device 500 that can be implemented as a computing device as described with reference to any of the previous FIGS. 1-4. The device 500 may be implemented as any one or combination of a fixed or mobile device in any form of a consumer, computer, portable, user, communication, phone, navigation, gaming, messaging, Web browsing, paging, media playback, or other type of electronic device.

The electronic device 500 can include one or more data input components 502 via which any type of data, media content, or inputs can be received such as user-selectable inputs, messages, music, television content, recorded video content, and any other type of audio, video, or image data received from any content or data source. The data input components 502 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 502 may also include various other input components such as microphones, touch sensors, keyboards, and so forth.

The electronic device 500 of this example includes a processor system 504 (e.g., any of microprocessors, controllers, and the like) or a processor and memory system (e.g., implemented in a system on a chip), which processes computer executable instructions to control operation of the device 500. A processor system 504 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 500 can be implemented with any one or combination of software, hardware, firmware, or fixed logic circuitry implemented in connection with processing and control circuits that are generally identified at 506. Although not shown, the electronic device 500 can include a system bus or data transfer system that couples the various components within the device 500. A system bus can include any one or combination of different bus structures such as a memory bus or memory controller, a peripheral bus, a universal serial bus, or a processor or local bus that utilizes any of a variety of bus architectures.

The electronic device 500 also includes one or more memory devices 508 that enable data storage such as random access memory, nonvolatile memory (e.g., read only memory, flash memory, erasable programmable read only memory, electrically erasable programmable read only memory, etc.), and a disk storage device. A memory device 508 provides data storage mechanisms to store the device data 510, other types of information or data (e.g., data backed up from other devices), and various device applications 512 (e.g., software applications). For example, an operating system 514 can be maintained as software instructions with a memory device and executed by the processor system 504.

In one or more embodiments the electronic device 500 includes a stowed detection system 118 and a sensor system 106, described above. Although represented as a software implementation, the stowed detection system 118 may be implemented as any form of a control application, software application, signal processing and control module, firmware that is installed on the device 500, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 508 and/or computer-readable media 114 of FIG. 1.

The electronic device 500 also includes a transceiver 520 that supports wireless and/or wired communication with other devices or services allowing data and control information to be sent as well as received by the device 500. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 500 can also include an audio or video processing system 522 that processes audio data or passes through the audio and video data to an audio system 524 or to a display system 526. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 528. In implementations the audio system or the display system are external components to the electronic device. Alternatively or in addition, the display system can be an integrated component of the example electronic device, such as part of an integrated touch interface.

Although embodiments of techniques for implementing stowed device detection using multiple sensors have been described in language specific to features or methods, the subject of the appended claims is not necessarily limited to the specific features or methods described. Rather, the specific features and methods are disclosed as example implementations of techniques for implementing stowed device detection using multiple sensors.

What is claimed is:

1. A method comprising:
  sensing, using at least a first sensor, sensor data including at least an ambient light value indicating an amount of light sensed by the first sensor in a computing device;
  checking whether the ambient light value is below a first threshold amount;
  determining, in response to the ambient light value being below the first threshold amount, whether the computing device is currently stowed or not stowed based on values from at least a second sensor situated on a first side of the computing device and a third sensor situated on a second side of the computing device; and
  storing an indication of whether the computing device is determined to be currently stowed or not stowed.

2. The method as recited in claim 1, the method further comprising:
  checking, in response to the ambient light value not being below the first threshold amount, whether a current state of the computing device is a Stowed state indicating that the computing device is currently stowed or a Not Stowed state indicating that the computing device is not currently stowed;
  in response to determining that the current state of the computing device is the Not Stowed state, reporting that the current state of the computing device remains in the Not Stowed state; and
  in response to determining that the current state of the computing device is the Stowed state, checking whether the ambient light value is above a second threshold amount, reporting that the current state of the computing device is now the Not Stowed state in response to the ambient light value being above the second threshold amount, and leaving the current state of the computing device as the Stowed state in response to the ambient light value not being above the second threshold amount.

3. The method as recited in claim 1, the second sensor comprising a proximity sensor, the determining comprising:
  checking whether the proximity sensor indicates an object is in close proximity to the computing device;
  checking, in response to the proximity sensor indicating that an object is in close proximity to the computing device, whether the third sensor indicates an object is within a first threshold distance of the computing device; and
  determining, in response to the third sensor indicating an object is within the first threshold distance of the computing device, with a first confidence value that the computing device is currently stowed.

4. The method as recited in claim 3, the sensor system further including a fourth sensor situated on the first side of the computing device, the method further comprising:
  checking, in response to the proximity sensor indicating that an object is not in close proximity to the computing device, whether the fourth sensor indicates an object is within a second threshold distance of the computing device;
  determining, in response to the fourth sensor indicating an object is within the second threshold distance of the computing device, with a second confidence value that the computing device is likely stowed, the second confidence value being less than the first confidence value; and
  determining, in response to the second additional sensor indicating an object is not within the second threshold distance of the computing device, that the computing device is likely not stowed.

5. The method as recited in claim 4, the method further comprising:
  checking, in response to the third sensor indicating an object is not within the first threshold distance of the computing device, whether the third sensor indicates an object is within a second threshold distance of the computing device, the second threshold distance being greater than the first threshold distance;
  determining, in response to the third sensor indicating an object is within the second threshold distance of the computing device, with a third confidence value that the computing device is likely stowed, the third confidence value being less than the first confidence value; and
  determining, in response to the third sensor indicating an object is not within the second threshold distance of the computing device, that the computing device is likely not stowed.

6. The method as recited in claim 3, the method further comprising:
  checking, in response to the third sensor indicating an object is not within the first threshold distance of the computing device, whether the third sensor indicates an object is within a second threshold distance of the computing device, the second threshold distance being greater than the first threshold distance;

determining, in response to the third sensor indicating an object is within the second threshold distance of the computing device, with a second confidence value that the computing device is likely stowed, the second confidence value being less than the first confidence value; and determining, in response to the third sensor indicating an object is not within the second threshold distance of the computing device, that the computing device is likely not stowed.

7. The method as recited in claim 1, the first side of the computing device comprising a front of the computing device and the second side of the computing device comprising a back of the computing device.

8. A computing device comprising:
a sensor system including a first sensor comprising an ambient light sensor, a second sensor situated on a first side of the computing device, and a third sensor situated on a second side of the computing device;
a processor; and
a non-transitory computer-readable storage medium having stored thereon multiple instructions that, responsive to execution by the processor, cause the processor to perform acts comprising:
obtaining sensor data including at least an ambient light value indicating an amount of light sensed by the ambient light sensor;
checking whether the ambient light value is below a first threshold amount;
determining, in response to the ambient light value being below the first threshold amount, whether the computing device is currently stowed or not stowed based on values from at least the second sensor and the third sensor; and
reporting an indication of whether the computing device is determined to be currently stowed or not stowed.

9. The computing device as recited in claim 8, the second side of the computing device being opposite the first side of the computing device.

10. The computing device as recited in claim 8, the acts further comprising:
checking, in response to the ambient light value not being below the first threshold amount, whether a current state of the computing device is a Stowed state indicating that the computing device is currently stowed or a Not Stowed state indicating that the computing device is not currently stowed;
in response to determining that the current state of the computing device is the Not Stowed state, reporting that the current state of the computing device remains in the Not Stowed state; and
in response to determining that the current state of the computing device is the Stowed state, checking whether the ambient light value is above a second threshold amount, reporting that the current state of the computing device is now the Not Stowed state in response to the ambient light value being above the second threshold amount, and leaving the current state of the computing device as the Stowed state in response to the ambient light value not being above the second threshold amount.

11. The computing device as recited in claim 8, the second sensor comprising a proximity sensor, the determining comprising:
checking whether the proximity sensor indicates an object is in close proximity to the computing device;
checking, in response to the proximity sensor indicating that an object is in close proximity to the computing device, whether the third sensor indicates an object is within a first threshold distance of the computing device; and
determining, in response to the third sensor indicating an object is within the first threshold distance of the computing device, with a first confidence value that the computing device is currently stowed.

12. The computing device as recited in claim 11, the sensor system further including a fourth sensor situated on the first side of the computing device, the acts further comprising:
checking, in response to the proximity sensor indicating that an object is not in close proximity to the computing device, whether the fourth sensor indicates an object is within a second threshold distance of the computing device;
determining, in response to the fourth sensor indicating an object is within the second threshold distance of the computing device, with a second confidence value that the computing device is likely stowed, the second confidence value being less than the first confidence value; and
determining, in response to the second additional sensor indicating an object is not within the second threshold distance of the computing device, that the computing device is likely not stowed.

13. The computing device as recited in claim 11, the acts further comprising:
checking, in response to the third sensor indicating an object is not within the first threshold distance of the computing device, whether the third sensor indicates an object is within a second threshold distance of the computing device, the second threshold distance being greater than the first threshold distance;
determining, in response to the third sensor indicating an object is within the second threshold distance of the computing device, with a third confidence value that the computing device is likely stowed, the third confidence value being less than the first confidence value; and
determining, in response to the third sensor indicating an object is not within the second threshold distance of the computing device, that the computing device is likely not stowed.

14. A computing device comprising:
a sensor system including a proximity sensor situated on a first side of the computing device and a first additional sensor situated on a second side of the computing device;
a processor; and
a non-transitory computer-readable storage medium having stored thereon multiple instructions that, responsive to execution by the processor, cause the processor to perform acts comprising:
checking whether the proximity sensor indicates an object is in close proximity to the computing device;
checking, in response to the proximity sensor indicating that an object is in close proximity to the computing device, whether the first additional sensor indicates an object is within a first threshold distance of the computing device; and determining, in response to the first additional sensor indicating an object is within the first threshold distance of the computing device, with a first confidence value that the computing device is likely stowed.

15. The computing device as recited in claim 14, the sensor system further including a second additional sensor situated on the first side of the computing device, the acts further comprising:

checking, in response to the proximity sensor indicating that an object is not in close proximity to the computing device, whether the second additional sensor indicates an object is within a second threshold distance of the computing device;

determining, in response to the second additional sensor indicating an object is within the second threshold distance of the computing device, with a second confidence value that the computing device is likely stowed, the second confidence value being less than the first confidence value; and determining, in response to the second additional sensor indicating an object is not within the second threshold distance of the computing device, that the computing device is likely not stowed.

16. The computing device as recited in claim 15, the acts further comprising:

checking, in response to the first additional sensor indicating an object is not within the first threshold distance of the computing device, whether the first additional sensor indicates an object is within a second threshold distance of the computing device, the second threshold distance being greater than the first threshold distance;

determining, in response to the first additional sensor indicating an object is within the second threshold distance of the computing device, with a third confidence value that the computing device is likely stowed, the third confidence value being less than the first confidence value; and determining, in response to the first additional sensor indicating an object is not within the second threshold distance of the computing device, that the computing device is likely not stowed.

17. The computing device as recited in claim 16, the first additional sensor comprising a laser sensor and the second additional sensor comprising an infrared sensor.

18. The computing device as recited in claim 17, the first side of the computing device comprising a front of the computing device and the second side of the computing device comprising a back of the computing device.

19. The computing device as recited in claim 16, the first threshold distance comprising six millimeters and the second threshold distance comprising one foot.

20. The computing device as recited in claim 14, the sensor system further including a second additional sensor situated on the first side of the computing device, the acts further comprising:

checking, in response to the first additional sensor indicating an object is not within the first threshold distance of the computing device, whether the first additional sensor indicates an object is within a second threshold distance of the computing device, the second threshold distance being greater than the first threshold distance;

determining, in response to the first additional sensor indicating an object is within the second threshold distance of the computing device, with a second confidence value that the computing device is likely stowed, the second confidence value being less than the first confidence value; and determining, in response to the first additional sensor indicating an object is not within the second threshold distance of the computing device, that the computing device is likely not stowed.

\* \* \* \* \*